United States Patent [19]

Grant et al.

[11] Patent Number: 5,030,004

[45] Date of Patent: Jul. 9, 1991

[54] PROCESS AND APPARATUS FOR CONTROLLING THE ALIGNMENT OF A TRANSMIT LASER BEAM OF A COHERENT DETECTION OPTICAL COMMUNICATIONS TRANSMITTER/RECEIVER TERMINAL

[75] Inventors: Michael A. Grant; David Robson, both of Stevenage, United Kingdom

[73] Assignee: British Aerospace Public Limited Company, London, England

[21] Appl. No.: 420,377

[22] Filed: Oct. 12, 1989

[30] Foreign Application Priority Data

Oct. 14, 1988 [GB] United Kingdom ............... 8824147
Oct. 14, 1988 [GB] United Kingdom ............... 8824150

[51] Int. Cl.$^5$ .............................................. G01B 11/26
[52] U.S. Cl. .................................. 356/153; 356/141; 455/606
[58] Field of Search ............... 356/121, 349, 141, 152, 356/153; 455/606, 607; 250/201.1

[56] References Cited

U.S. PATENT DOCUMENTS

| | | | |
|---|---|---|---|
| 4,579,463 | 1/1986 | Rosencwaig et al. | 356/445 |
| 4,825,113 | 4/1989 | Sato et al. | 455/606 |
| 4,867,560 | 9/1989 | Kunitsugu | 455/606 |
| 4,888,816 | 12/1989 | Sica | 455/607 |

Primary Examiner—Richard A. Rosenberger
Attorney, Agent, or Firm—Cushman, Darby & Cushman

[57] ABSTRACT

A process and apparatus are provided for controlling the alignment of a transmit laser beam (1a) of a first coherent detection optical communications transmitter/receiver terminal with a further coherent detection optical communications transmitter/receiver terminal relative to a receive laser beam (8). The first terminal incorporates a transmit laser beam generator (1) operable to form and pass the transmit beam (1a) through a point ahead mechanism (2) to a telescope assembly (6) operable to receive the receive laser beam (8). The apparatus includes a detector/receiver unit, means (3) for taking a component (1b) of the transmit laser beam (1a) from the transmit laser beam (1a) for receiving the receive laser beam (8) from the telescope assembly (6) and for feeding the transmit laser beam (8) to the detector/receiver unit (10), and means (16, 17, 18, 19, 20, 21, 22, 23, 24) for detecting, separating and processing the received transmit laser beam component (1b) and received receive beam (8) at the detector/receiver unit (10) to provide signals indicative of the actual alignment of the transmit and receive beams (1a, 8), means (25) for comparing the actual alignment signals with desired alignment values to generate difference signals and means for operating the point ahead mechanism (2) in dependence upon the generated difference signals variably to control the alignment of the transmit beam (1a) relative to the receive beam (8).

17 Claims, 2 Drawing Sheets

PROCESS AND APPARATUS FOR CONTROLLING THE ALIGNMENT OF A TRANSMIT LASER BEAM OF A COHERENT DETECTION OPTICAL COMMUNICATIONS TRANSMITTER/RECEIVER TERMINAL

FIELD OF THE INVENTION

This invention relates to a process and apparatus for controlling the alignment of a transmit laser beam of a coherent detection optical communications transmitter/receiver terminal with a further coherent detection optical communications transmitter/receiver terminal relative to a receive laser beam received from said further terminal, particularly, but not exclusively, suitable for communication between two spacecraft on which the two terminals may be carried.

BACKGROUND OF THE INVENTION

It has been proposed that two spacecraft might communicate one with another via laser beams. Each spacecraft would be provided with a transmitter/receiver terminal able to transmit a modulated laser beam to another spacecraft and to receive a modulated beam sent from that other spacecraft.

The terminals must then be accurately tracked one onto another using movable mirror mechanisms and in addition the transmit laser beam must be aligned and pointed to a position where the other spacecraft will be when the beam reaches it as the two spacecraft, and hence terminals, may be moving relative to one another. Thus each terminal may comprise a single telescope assembly and common pointing mechanisms (movable mirror assemblies for example) for the transmitter and receiver parts of the terminal. By use of the pointing mechanism(s), the transmit laser beam may be maintained pointing at the other spacecraft or, since the two will be moving relative to one another, at the position where the other spacecraft will be when the laser radiation arrives at the other spacecraft (using appropriate look-ahead mechanisms) while the receiver has to be kept tracked onto the receive beam in the face of disturbances such as background radiation, vibration of the spacecraft frame, and other transient features such as thermal expansion and contraction of the terminal due to heat radiation from the sun.

These disturbances are variable and this means that the pointing mechanism (point ahead mechanism) for the transmit beam in particular has to be controlled for alignment and/or calibration at least occasionally and it is desirable that this should be done without interrupting communication, preferably automatically. The possibility of maintaining similar control of the receive beam pointing mechanism is also desirable.

OBJECTS OF THE INVENTION

Thus one object of the present invention is to provide a generally improved process and apparatus for controlling the alignment of a transmit laser beam of a coherent detection optical communications transmitter/receiver terminal with a further coherent detection optical communications transmitter/receiver terminal relative to a receive laser beam received from said further terminal.

This and other objects and advantages of the present invention will become more apparent from details disclosed in the following specification where preferred embodiments of the invention are disclosed.

SUMMARY OF THE INVENTION

According to one aspect of the present invention there is provided a process for controlling the alignment of a transmit laser beam of a coherent detection optical communications transmitter/receiver terminal with a further coherent detection optical communications transmitter/receiver terminal relative to a receive laser beam received from said further terminal, including the steps of taking a component of the transmit laser beam from the transmit laser beam, which transmit laser beam primary polarisation is orthogonal to the polarisation of the receive laser beam, feeding the transmit laser beam component with the receive laser beam to a detector/receiver unit, detecting, separating and processing the received transmit laser beam component and received receive beam at said unit to provide signals indicative of the actual alignment of the transmit and receive beams, comparing the actual alignment signals with desired alignment values to generate difference signals and using the generated difference signals variably to control the alignment of the transmit beam relative to the receive beam.

Advantageously the transmit laser beam component is cross-polarised, and the transmit laser beam component and the receive laser beam are combined and mixed with a local oscillator laser beam prior to feeding to the detector/receiver unit.

Conveniently the combined and mixed transmit laser beam component receive laser beam and local oscillator beam are received on an at least four quadrant detector portion of the unit and the resulting quadrant output signals amplified, filtered, and processed to provide a summed communications output signal, transmit beam alignment control signals and receive beam tracking control signals.

Preferably the transmit beam alignment control signals provided are a sum, and azimuth and elevation difference signals, and in which the azimuth and elevation difference signals are frequency discriminated, with reference to the desired point ahead angle of the transmit beam relative to the receive beam, to provide absolute and relative values for variably controlling the alignment of the transmit beam relative to the receive beam.

Advantageously the transmit beam alignment control azimuth signal is the difference between the sum of the output signals from a first two adjacent quadrants of the detector portion and the sum of the output signals from the two other adjacent quadrants of the detector portion, and in which the transmit beam alignment control elevation signal is the difference between the sum of the output signals from one of said first two quadrants and one of said other two quadrants and the sum of the output signals from the other of said first two quadrants and the other of said other two quadrants, with the transmit beam alignment control azimuth and elevation signals being operable to indicate displacement of the receive beam from the detector portion centre.

Conveniently the receive beam tracking control signals provided are a sum, and azimuth and elevation difference signals, which are operable to control beam pointing mechanisms for controlling tracking of the terminal to the receive beam from the further terminal.

According to a further aspect of the present invention there is provided apparatus for controlling the alignment of a transmit laser beam of a first coherent detection optical communications transmitter/receiver terminal with a further coherent detection optical communcations transmitter/receiver terminal relative to a receive laser beam when received from said further terminal, which first terminal incorporates a transmit laser beam generator operable to form and pass the transmit beam through a point ahead mechanism to a telescope assembly operable to receive said transmit laser beam, wherein said apparatus includes a detector/receiver unit, means for taking a component of the transmit laser beam from the transmit laser beam, which transmit laser beam primary polarisation is orthogonal to the polarisation of the receive laser beam, receiving the receive laser beam from the telescope assembly and feeding the transmit laser beam component and the receive laser beam to the detector/receiver unit, which taking, receiving and feeding means is locatable in the laser beam path between the point ahead mechanism and the telescope assembly, means for detecting, separating and processing the received transmit laser beam component and received receive beam at the detector/receiver unit to provide signals indicative of the actual alignment of the transmit and receive beams, means for comparing the actual alignment signals with desired alignment values to generate difference signals and means for operating the point ahead mechanism in dependence upon the generated difference signals variably to control the alignment of the transmit beam relative to the receive beam.

Preferably the taking, receiving and feeding means is a spectral isolator.

Conveniently the spectral isolator includes a quarter wave plate, a polarisation sensitive beam splitter operable to receive the transmit laser beam from the point ahead mechanism, to reflect a major portion of the transmit beam to the telescope assembly and to transmit a component of the transmit beam to the quarter wave plate, a corner cube reflector operable to receive the transmit beam component from the quarter wave plate and to return it therethrough to the beam splitter at which it is reflected as the transmit beam component to the detector/receiver unit together with the receive laser beam passed through the beam splitter from the telescope assembly.

Advantageously the apparatus includes a combining dichroic mirror and a local oscillator laser beam generator locatable and operable so that the transmit beam component, which is cross-polarised, and receive beam are received from the spectral isolator beam splitter on the combining mirror, combined thereat with the local oscillator beam and passed therefrom to the detecting means of the detector/receiver unit.

Preferably the detecting means of the detector/receiver unit includes an at least four quadrant detector portion operable to receive the combined and mixed transmit beam component, receive beam and local oscillator beam, and to provide at least four output signals.

Conveniently the at least four quadrant detector portion includes a four quadrant PIN diode detector formed on a single semiconductor substrate.

Advantageously the means for processing the transmit laser beam component and receive beam received at the detector includes four low noise amplifiers operable to amplify respective ones of the signals from the four quadrants of the detectors.

Preferably the four amplifiers are formed on the same single semi conductor substrate as the four quadrants.

Conveniently the processing and comparing means includes four frequency discriminating filters operable to process respective ones of the signals from the four quadrant amplifiers and a filtering, rectification and processing circuit operable to generate a sum signal, an elevation difference signal and an azimuth signal for controlling the point ahead mechanism.

Advantageously the detector/receiver unit includes four further frequency discriminating filters operable to process respective ones of the signals from the four quadrant amplifiers, a summing amplifier for summing the signals received from said four further filters to provide an actual received receive beam output signal and a further filtering, rectification and processing circuit operable to receive signals from the further four discriminating filters and generate therefrom a further sum signal, a further elevation difference signal and a further azimuth signal for use to control the main tracking of the receive laser beam.

Preferably the four PIN quadrants are formed around a central PIN diode site, with the central diode site being operable to provide the received receive beam output signal and with the quadrants being operable to provide signals for controlling the point ahead mechanism.

DESCRIPTION OF THE DRAWINGS

For a better understanding of the present invention and to show how the same may be carried into effect, reference will now be made, by way of example, to the accompanying drawings, in which.

DESCRIPTION OF THE EMBODIMENTS OF THE INVENTION

Figure 1:
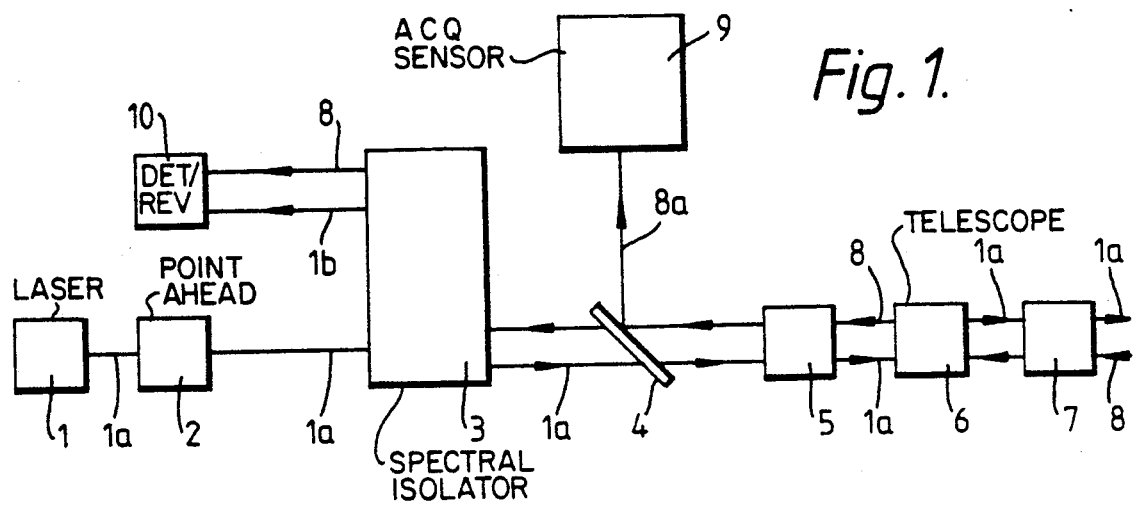
FIG. 1 is a diagrammatic schematic view of a coherent detection optical communications transmitter/receiver terminal embodying apparatus according to the present invention for controlling the alignment of the transmit laser beam.

FIG. 1 of the accompanying drawings shows in very general form a coherent detection optical communications transmitter/receiver terminal embodying apparatus of the present invention for controlling the alignment of a transmit laser beam of the terminal with a further coherent detection optical communications transmitter/receiver terminal relative to a receive laser beam when received from the further terminal. The illustrated terminal includes a laser source 1, conveniently a laser diode transmitter package operable to generate a transmit laser beam 1a and pass it to a point ahead mechanism 2 from whence it passes via a device 3, beam splitter mirror 4, fine pointing mechanism 5, telescope assembly 6 and coarse pointing mechanism 7 to the other terminal. The illustrated terminal and the other terminal may be carried on separate spacecraft (not shown). Pointing mechanisms 5 and 7 incorporate servo-controlled mirror assemblies for tracking the other spacecraft carrying the other terminal.

A receive laser beam 8 received from the other spacecraft terminal passes via the coarse pointing mechanisms 7, telescope assembly 6 and fine pointing mechanism 5 to mirror 4 from which part 8a is directed to an acquisition sensor detector unit 9 which senses acquisition of a signal. The function of the point ahead mechanism 2, another servo-controlled mirror assembly, is to maintain the transmit laser beam 1a aimed towards the expected position of the other terminal (satellite) at the time the beam reaches it, that is to send the transmit laser beam 1a at an angle to the receive laser beam 8. This point ahead mechanism 2 has to be aligned and/or calibrated at least occasionally to maintain the alignment of the transmit beam 1a relative to receive beam 8, preferably without interrupting communication.

To do this there is provided, according to the present invention, apparatus for controlling the alignment of the transmit laser beam 1a of the illustrated transmitter/receiver terminal with a further coherent optical communications transmitter/receiver terminal relative to the received beam 8 when received from the further terminal and a process for such control. The apparatus of the invention basically includes a detector/receiver unit 10 and means, such as the device 3, for taking a, preferably cross-polarised, component 1b from the transmit beam 1a and feeding the component 1b to the detector/receiver unit 10.

The process of the invention for controlling the alignment of the transmit beam 1a relative to the receive beam 8 includes taking the cross polarised component 1b of the transmit laser beam 1a at the device 3, which transmit beam 1a primary polarisation is orthogonal to the polarisation of the receive beam 8 and feeding the component 1b with the receive beam 8 passed through the device 3 to the detector/receiver unit 10 where the component 1b and the received receive beam 8 are detected, separated and processed to provide signals indicative of the actual alignment of the the transmit and receive beams 1a and 8. By the term 'orthogonal' it is to be understood that at least 99.99% of the transmit beam 1a is orthogonal to the receive beam 8, but the remainder of the transmit beam 1a may not be. The actual alignment signals are then compared with desired alignment values to generate different signals and the generated different signals are used variably to control the alignment of the transmit beam 1a, via the point ahead mechanism 2, relative to the receive beam 8.

To this end the device 3 of the apparatus is a spectral isolator operable to carry out the taking, receiving and feeding steps of the process. The transmit and receive beams 1 and 1a and 8 are orthogonally polarised towards one another and spaced apart in frequency such that the intermediate frequency signals, after the beams have been mixed with a local oscillator laser beam or signal 11 generated by a laser beam generator 11a, are within the band width of the detector/receiver unit 10 which is the main tracking and communication receiver.

Figure 3:
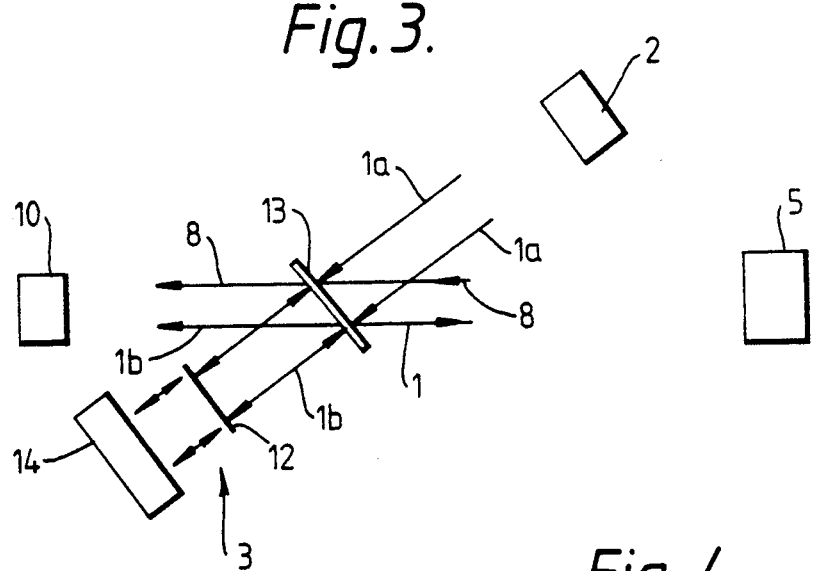
FIG. 3 is a diagrammatic view of a spectral isolator forming part of the apparatus of the invention of FIG. 2.

As shown in FIG. 3 the spectral isolator 3 includes a quarter wave plate 12 and a polarisation sensitive beam splitter 13 operable to receive the transmit beam 1a from the point ahead mechanism 2 and the reflected towards the fine pointing mechanism 5 and telescope assembly 6 of FIG. 1. The receive laser beam 8 is transmitted on by the splitter 13 to the detector/receiver unit 10. A component 1b of the transmit beam 1a is passed by the beam splitter 13 to the quarter wave plate 12 and from thence to a corner cube reflector 14 which reflects it back to the beam splitter 13 via the quarter wave plate 12. Having been subjected to two passes through the plate 12 the returned transmit beam cross polarised component 1b is reflected by the beam splitter 13 together with the receive beam 8 passed through the beam splitter 13 from the telescope assembly 6 and fine pointing mechanism 5, to the detector/receiver unit 10.

Thus the isolator 3 receives on one polarisation and transmits from the beam splitter 13 on the other polarisation. Any residual cross polarised component 1b which passes directly through the splitter 13 is rotated through 45° by the plate 12, reflected off the reflector 14 back to the plate 12 where it is again rotated through 45° such that its polarisation is in the reflecting plane so that it can be reflected by the splitter 13 to the unit 10.

Figure 2:
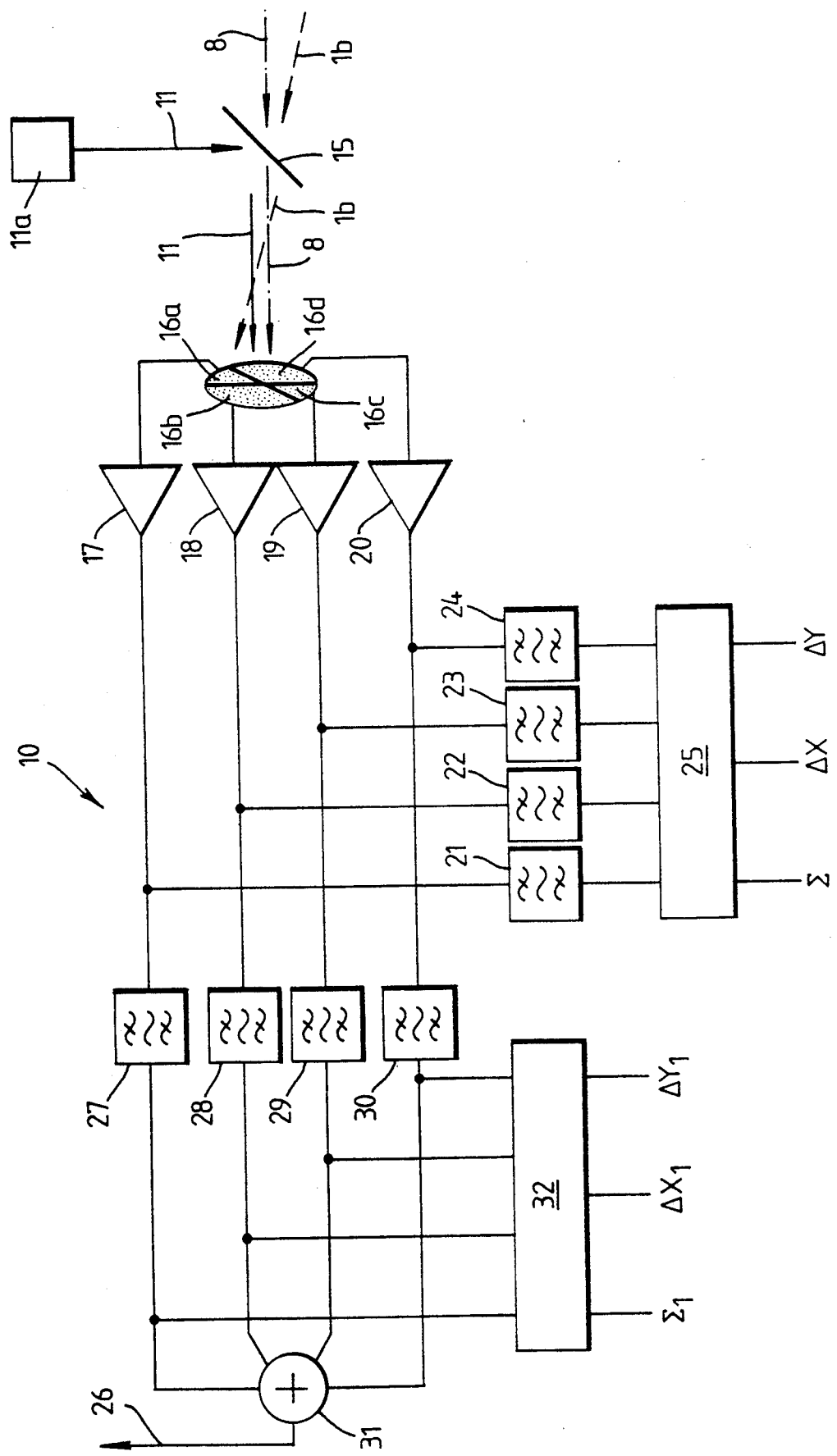
FIG. 2 is diagrammatic view, to a larger scale, of a detector/receiver unit forming part of the apparatus of the invention of FIG. 1.

As can be seen from FIG. 2 the received receive beam 8 and component 1b of the transmit beam 1a are fed to a combining dichroic mirror 15 where they are mixed with the local oscillator laser signal beam 11 which is circularly polarised. The mixed beams 11, 8 and component 1b are passed by the combining mirror 15 to the detector/receiver unit 10 as shown in more detail in FIG. 2.

More specifically the beams 8, 11 and component 1b are passed to detecting means of the unit 10 which detecting means basically includes an at least four quadrant detector portion having quadrants 16a, 16b, 16c and 16d. In the embodiment illustrated in FIG. 2 the four quadrants 16a, 16b, 16c and 16d form a four quadrant PIN diode detector formed on a single semi conductor substrate (not shown) together with four low noise amplifiers 17, 18, 19 and 20 operable to amplify respective signals from the four quadrants 16a, 16b, 16c and 16d.

The unit 10 also includes processing and comparing means for taking the signals received from the amplifiers 17, 18, 19 and 20 which output signals are indicative of the actual alignment of the transmit and receive beams, and comparing the actual alignment signals with desired alignment values to generate different signals. As shown in FIG. 2 the processing and comparing means includes four frequency discriminating filters 21, 22, 23 and 24 operable to process respective signals from the amplifiers 17, 18, 19 and 20 and a filtering rectification and processing circuit 25 for receiving the signals from the filters 21, 22, 23, and 24 and operable to generate a sum signal $\Sigma$ an elevation signal $\Delta Y$ and and azimuth signal $\Delta X$. The detector/receiver unit 10 also includes means for providing an actual received receive beam output signal 26. In the embodiment illustrated in FIG. 2 the latter means includes four further frequency discriminating filters 27, 28, 29 and 30 which may be dispensed with if necessary. The four further filters 27, 28, 29 and 30 receive the respective output signals from the respective amplifiers 17, 18, 19 and 20, select the signals indicative of the received receive beam 8 and pass it to a summing amplifier 31 from which the actual received output signal 26a is derived.

The signal $\Delta Y$ issuing from the circuit 25 represents the difference between the sum of the signals from the upper two detector quadrants 16b and 16a in FIG. 2 and the sum of the signals from the two lower quadrants 16c and 16d. The signal $\Delta X$ issuing from circuit 25 represents the difference between the sum of the signals from quadrants 16b and 16c and the sum of the signals from quadrants 16a and 16d. The sum signal $\Sigma$ can be used for gain control in tracking electronics (not shown) while $\Delta X$ and $\Delta Y$ indicate the tracking errors, that is any off centring of the transmit receive beam 8 from the centre of the detector represented by the four quadrants 16a, 16b, 16c and 16d, and are used to control the point ahead mechanism 2. This is done by knowing the desired point ahead angle of the transmit beam 1a relative to the receive beam 8, the azimuth difference signal ΔY and the elevation difference signal ΔX from circuit 25 can be discriminated for appropriate absolute and relative values and used continuously to maintain the alignment and calibration of the point ahead mechanism 2.

Additionally, as shown in the FIG. 2 embodiment a further filtering rectification and processing circuit 32 may be provided which is operable to receive signals from the filters 27, 28, 29 and 30 to generate a further sum signal $\Sigma_1$, elevation difference signal $\Delta Y_1$ and azimuth difference $\Delta X_1$ which are used for controlling the pointing mechanisms 5 and 7 to maintain the terminal, and specifically the detector/receiver unit 10, accurately tracked to the received receive beam 8.

Because the same detector quadrants 16a, 16b, 16c and 16d are used for tracking and receiving the received beam 8 and transmit beam component 1b there is no problem of misalignment which could occur if four separate orthogonally arranged PIN diode detectors were used. Additionally because the quadrants and the amplifiers 17, 18, 19 and 20 are together on the same substrate they tend to maintain proper alignment and balance. The detector formed by the quadrant 16a, 16b, 16c and 16d may be made by first forming a PIN detector site on a substrate and then etching it using a suitably shaped mask to divide the site into the required four quadrants. If desired there can be more than four quadrants, that is the detector could be made up of six or more PIN diodes adjacent one another and forming "quadrants".

Figure 4:
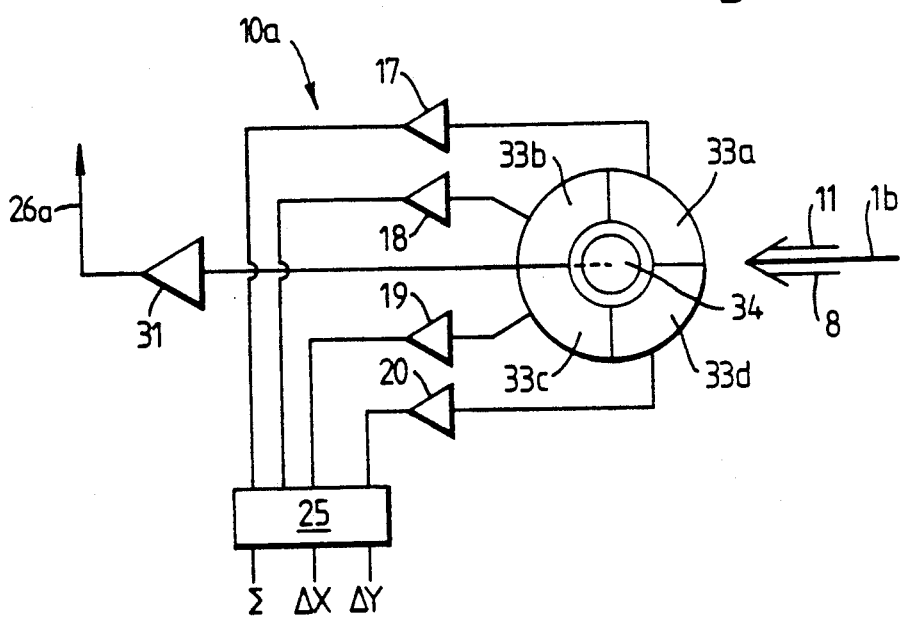
FIG. 4 is a diagrammatic view similar to that of FIG. 2 of an alternative form of detector/receiver unit for use in the apparatus of FIGS. 1 and 3 of the invention.

FIG. 4 shows an alternative form of detector/receiver unit 10a in which the detector portion comprises four PIN diode quadrants 33a, 33b, 33c and 33d formed around a central PIN diode site 34. In this embodiment the central site 34 can be used as the detector for the received receive beam signal 8 which is passed to the summing amplifier 31 directly bypassing the amplifier 17, 18, 19 and 20 and any filters, 27, 28, 29 and 30 if utilised. Thus in the FIG. 4 example the four quadrants 33a, 33b, 33c and 33d provide, via the circuit 25 the signals Σ, ΔX and ΔY for controlling the alignment of the transmit beam 1a relative to the receive beam 8 via the point ahead mechanism 2.

Various modifications and alterations may be made to the embodiments of the present invention described and illustrated, within the scope of the present invention as defined in the following claims.

What is claimed is:

1. A process for controlling the alignment of a transmit laser beam of a coherent detection optical communications transmitter/receiver terminal with a further coherent detection optical communications transmitter/receiver terminal relative to a receive laser beam received from said further terminal, including the steps of taking a component of the transmit laser beam from the transmit laser beam, which transmit laser beam primary polarisation is orthogonal to the polarisation of the receive laser beam, feeding the transmit laser beam component with the receive laser beam to a detector/receiver unit, detecting, separating and processing the received transmit laser beam component and received receive beam at said unit to provide signals indicative of the actual alignment of the transmit and receive beams, comparing the actual alignment signals with desired alignment values to generate difference signals and using the generated difference signals variably to control the alignment of the transmit beam relative to the receive beam.

2. A process according to claim 1, in which the component of the transmit laser beam is cross-polarised with respect to the receive laser beam, and in which the transmit laser beam component and the receive laser beam are combined and mixed with a local oscillator laser beam prior to feeding to the detector/receiver unit.

3. A process according to claim 2, in which the combined and mixed transmit laser beam component, receive laser beam and local oscillator beam are received on an at least four quadrant detector portion of the unit and the resulting quadrant output signals amplified, filtered, and processed to provide a summed communications output signal, transmit beam alignment control signals and receive beam tracking control signals.

4. A process according to claim 3, in which the transmit beam alignment control signals provided are a sum, and azimuth and elevation difference signals, and in which the azimuth and elevation difference signals are frequency discriminated, with reference to the desired point ahead angle of the transmit beam relative to the receive beam, to provide absolute relative values for variably controlling the alignment of the transmit beam relative to the receive beam.

5. A process according to claim 4, in which the transmit beam alignment control azimuth signal is the difference between the sum of the output signals from a first two adjacent quadrants of the detector portion and the sum of the output signals from the two other adjacent quadrants of the detector portion, and in which the transmit beam alignment control elevation signal is the difference between the sum of the output signals from one of said first two quadrants and one of said other two quadrants and the sum of the output signals from the other of said first two quadrants and the other of said other two quadrants, with the transmit beam alignment control azimuth and elevation signals being operable to indicated displacement of the receive beam from the detector portion centre.

6. A process according to claim 5, in which the receive beam tracking control signals provided are a sum, and azimuth and elevation difference signals, which are operable to control beam pointing mechanisms for controlling tracking of the terminal to the receive beam from the further terminal.

7. Apparatus for controlling the alignment of a transmit laser beam of a first coherent detection optical communications transmitter/receiver terminal with a further coherent detection optical communications transmitter/receiver terminal relative to a receive laser beam when received from said further terminal, which first terminal incorporates a transmit laser beam generator operable to form and pass the transmit beam through a point ahead mechanism to a telescope assembly operable to receive said transmit laser beam, wherein said apparatus includes a detector/receiver unit, means for taking a component of the transmit laser beam from the transmit laser beam, which transmit laser beam primary polarisation is orthogonal to the polarisation of the receive laser beam, receiving the receive laser beam from the telescope assembly and feeding the transmit laser beam component and the receive laser beam to the detector/receiver unit, which taking, receiving and feeding means is locatable in the laser beam path between the point ahead mechanism and the telescope assembly, means for detecting, separating and processing the received transmit laser beam component and received receive beam at the detector/receiver unit to provide signals indicative of the actual alignment of the transmit and receive beams, means for comparing the actual alignment signals with desired alignment values to generate difference signals and means for operating the point ahead mechanism in dependence upon the generated difference signals variably to control the alignment of the transmit beam relative to the receive beam.

8. Apparatus according to claim 7, wherein the taking, receiving and feeding means is formed by a spectral isolator.

9. Apparatus according to claim 8, wherein the spectral isolator includes a quarter wave plate, a polarisation sensitive beam splitter operable to receive the transmit laser beam from the point ahead mechanism, to reflect a major portion of the transmit beam to the telescope assembly and to transmit a component of the transmit beam to the quarter wave plate, a corner cube reflector operable to receive the transmit beam component from the quarter wave plate and to return it therethrough to the beam splitter at which it is reflected as the cross polarised transmit beam component to the detector/receiver unit together with the receive laser beam passed through the beam splitter from the telescope assembly.

10. Apparatus according to claim 9, including a combining dichroic mirror and a local oscillator laser beam generator locatable and operable so that the component of the transmit beam which is cross-polarised with respect to the receive beam, and receive beam are received from the spectral oscillator beam splitter on the combining mirror, combined thereat with the local oscillator beam and passed therefrom to the detecting means of the detector/receiver unit.

11. Apparatus according to claim 10, wherein the detecting means of the detector/receiver unit includes an at least four quadrant detector portion operable to receive the combined and mixed transmit beam component, receive beam and local oscillator beam, and to provide at least four output signals.

12. Apparatus according to claim 11, wherein the at least four quadrant detector portion includes a four quadrant PIN diode detector formed on a single semiconductor substrate.

13. Apparatus according to claim 12, wherein the means for processing the transmit laser beam component and receive beam received at the detector includes four low noise amplifiers operable to amplify respective ones of the signals from the four quadrants of the detector.

14. Apparatus according to claim 13, wherein the four amplifiers are formed on the same single semi conductor substrate as the four quadrants.

15. Apparatus according to claim 13, wherein the processing and comparing means includes four frequency discriminating filters operable to process respective ones of the signals from the four quadrant amplifiers and a filter, rectification and processing circuit operable to generate a sum signal, an elevation difference signal and an azimuth signal for controlling the point ahead mechanism.

16. Apparatus according to claim 15, wherein the detector/receiver unit includes four further frequency discriminating filters operable to process respective ones of the signals from the four quadrant amplifiers, a summing amplifier for summing the signals received from said four further filters to provide an actual received receive beam output signal and a further filtering, rectification and processing circuit operable to receive signals from the further four frequency discriminating filters and generate therefrom a further sum signal, a further elevation difference signal and a further azimuth difference signal for use to control the main tracking of the receive laser beam.

17. Apparatus according to claim 12, wherein the four PIN quadrants are formed around a central PIN diode site, with the central diode site being operable to provide the received receive beam output signal and with the quadrants being operable to provide signals for controlling the point ahead mechanism.

* * * * *